United States Patent [19]
Hagen

[11] 3,769,849
[45] Nov. 6, 1973

[54] BICYCLE WITH INFINITELY VARIABLE RATIO DRIVE

[76] Inventor: Earl W. Hagen, 312 W. Stella Ln., Phoenix, Ariz. 85013

[22] Filed: Aug. 2, 1972

[21] Appl. No.: 277,364

[52] U.S. Cl. .......................... 74/217 B, 74/230.17 D
[51] Int. Cl. ........................ F16h 11/04, F16h 55/22
[58] Field of Search ................. 74/217 B, 230.17 D

[56] References Cited
UNITED STATES PATENTS

| 628,585 | 7/1899 | Lane et al. ........................ 74/217 B |
| 2,193,289 | 3/1940 | MacBlane ......................... 74/217 B |
| 3,129,598 | 4/1964 | Buss ............................ 74/230.17 D |
| 3,165,003 | 1/1965 | Buss ............................ 74/230.17 D |
| 3,628,390 | 12/1971 | Van Der Lely ............. 74/230.17 D |

*Primary Examiner*—Leonard H. Gerin
*Attorney*—William C. Cahill et al.

[57] ABSTRACT

In order to afford an infinite selection of drive ratios, between low speed and high speed extremes, the coaster brake at the bicycle rear wheel, is driven by a foot operated crank through an intermediate variable pitch idler mechanism. The variable pitch idler mechanism is a dual pulley device disposed proximate and beneath the rear portion of the bicycle seat. One pulley side of the variable pitch idler mechanism is coupled through a first relatively wide, tapered-sided belt to the foot operated crank, and the other pulley side is similarly coupled to the coaster brake. The inner halves of the two pulley sections of the variable pitch idler mechanism are coupled together and are free to move laterally on a shaft toward and away from the outer pulley sections. Hence, as the center section moves laterally, the effective diameters of the driving and driven pulley sections varies because one tapered belt will drop deeper into its pulley section as the other belt moves outwardly in its pulley section. The entire variable pitch idler mechanism is pivotally supported for fore and aft movement, and the operating position is determined by the position of a speed selector lever to which the idler mechanism is coupled. By shifting the idler mechanism fore and aft, the tension of the two belts cooperate to shift the inner pulley element laterally to accordingly adjust the overall ratio between the foot operated crank and the coaster brake.

4 Claims, 4 Drawing Figures

PATENTED NOV 6 1973

3,769,849

BICYCLE WITH INFINITELY VARIABLE RATIO DRIVE

This invention relates to foot powered vehicle drive systems, and, more particularly, to an infinitely variable multi-speed bicycle drive.

Present practice on commercially available multi-speed bicycles is to drive the rear wheel by means of sprockets on the rear wheel and on a foot operated crank connected by an endless roller chain. Various driving ratios between the crank sprocket and the rear wheel are achieved in basically one of two ways. One system utilizes a planetary gear hub built into the rear wheel. The drive ratio of this hub is changed by means of a cable-actuated device which positions internal members of the hub. This arrangement is limited by practical considerations to three different drive ratios and results in the commonly referred to "three speed" bicycle. A second system utilizes multiple sprockets on either or both the crank and the rear wheel. These sprockets have different numbers of teeth, and the roller chain is caused to engage various combinations of these sprockets to achieve different drive ratios. The most common bicycles of this type use a five sprocket rear hub and a two sprocket crank to provide ten separate driving ratios to the rear wheel. These are referred to as "ten-speed" bicycles.

Both of the above described systems of varying drive ratios have inherent disadvantages. The three speed planetary hub has, of necessity, large increments between ratios in order to achieve the range of ratios needed to accommodate various terrains which may be encountered and the physical capabilities of the rider. These large increments between the ratios necessarily reduce the the efficiency and comfort of the rider. Additionally, adjustment of the actuating mechanism is complex and critical. Because the movement must be transmitted from the handlebars or some other easily accessible position to the center of the rear hub, a long cable and pulley arrangement is needed. Normal cable stretch neccesitates frequent adjustment due to the rather small amount of control motion between the ratios.

The 10 speed drive system also uses cables, pulleys, and levers to cause the roller chain to engage the various sprockets to provide the desired drive ratio. The different lengths of roller chain needed for the various sprocket combinations is achieved through a derailleur mechanism in the chain loop. The same type of adjustment problems are encountered here as in the three speed system. Cables are used to position the derailleur and the crank sprocket selector. Thus, two separate control systems are needed to select the desired drive ratio. This is also cumbersome for the rider. The increments between drive ratios are smaller than in the three speed, but are still definite steps often requiring two separate control movements to select the desired ratio. A change of sprockets is necessary to make slight alterations in the drive ratios and range of ratios to suit individual tastes or requirements.

The above disadvantages are dissipated by the following disclosed and claimed invention. In the subject drive system, the rear wheel is driven by a foot operated crank through an intermediate variable pitch idler mechanism. Tapered belts are used to transmit the drive between the various segments. The variable pitch idler mechanism is a dual pulley device, one side of which is connected by a belt to the foot operated crank, and the other side is similarly connected to a coaster brake at the rear wheel. The two pulleys change pitch diameters simultaneously and in inverse proportions. That is, as one side increases in pitch diameter the other side decreases in pitch diameter. Control of the pitch diameters is effected by the operator by altering the fore and aft position of the idler mechanism which is positioned well above a line drawn between the center of the crank and the center of the coaster brake.

It is therefore a broad object of my invention to provide an improved drive system for a bicycle.

It is another broad object of my invention to provide an improved variable ratio drive system for a bicycle.

It is a more specific object of my invention to provide such a variable ratio for a bicycle in which the drive ratio selected by an operator may fall in an infinite variety of ratios between a high speed and a low speed extreme.

It is a corresponding object of my invention to provide such apparatus which is simple and reliable and which may be readily and inexpensively fabricated.

The subject matter of the invention is particularly pointed out and distinctly claimed in the concluding portion of the specification. The invention, however, both as to organization and method of operation, may best be understood by reference to the following description taken in connection with the accompanying drawing of which:

Figure 1:
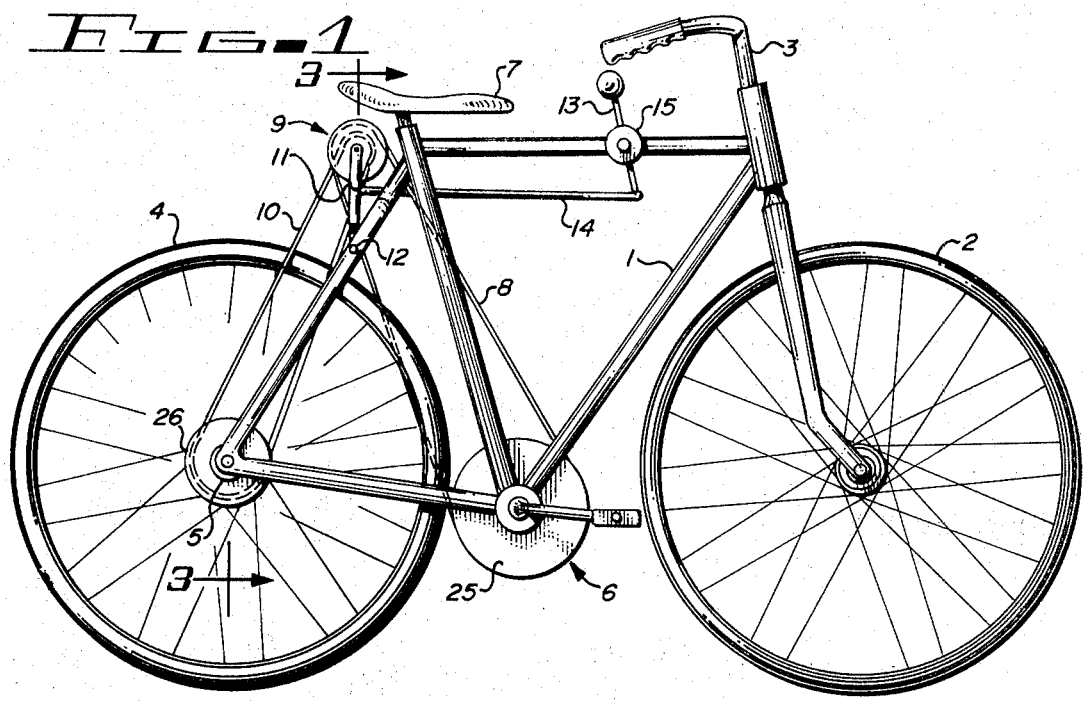
FIG. 1 is a side view of a bicycle incorporating the drive system of my present invention.

Referring now to FIG. 1, it will be observed that the drive mechanism of the present invention is incorporated into an otherwise conventional bicycle which includes the usual frame 1, a front wheel 2 steerable by handlebar apparatus 3, rear wheel 4 incorporating a coaster brake 5, a foot operated crank 6, and a seat 7. However, it will be noted that the foot operated crank 6 does not communicate with the coaster brake 5 through the usual chain linkage in any of the common variations thereof. Rather, the foot operated crank 6 drives, through a first belt 8, a variable pitch idler mechanism 9 disposed beneath the seat 7, the variable pitch idler mechanism 9 driving, in turn, the coaster brake 5 through a second belt 10. The idler mechanism 9 is supported on a carriage assembly 11 which is secured for fore and aft pivotal movement to the frame 1 by pivot means 12. The carriage 11 is coupled to a ratio selector lever 13 by a link 14 which is pivotally secured to the lower end of the selector lever 13 at its forward end and pivotally connected to the carriage 11 at its rearward end. The ratio selector lever 13 is also pivotally fixed to the frame 1 intermediate along the lever length by the friction brake means 15 which may be adjusted to hold the control linkage in any selected position between two extremes.

Figure 2:
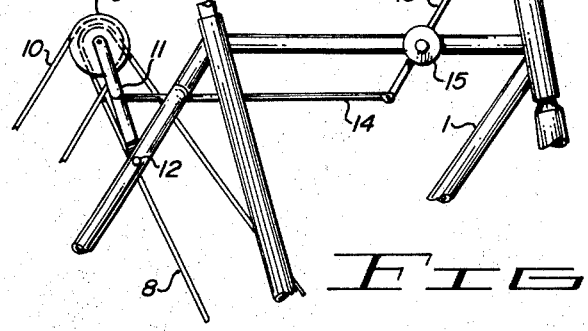
FIG. 2 is a partially broken-away side view of a bicycle illustrated in FIG. 1 showing certain of the linkage structure involved in effecting a ratio change.

In FIG. 1, it will be observed that the upper portion of the selector lever 13 is pulled to a generally rearward position which, through the control linkage, pulls the carriage 11 to a generally forward position. In contrast, FIG. 2 illustrates the selector lever 13 pushed forwardly which moves the carriage 11 to a more rearwardly position. As will become apparent from the following description of the idler mechanism and its operation, FIG. 1 illustrates the drive apparatus oriented in a low speed, high torque configuration. Conversely, the orientation illustrated in FIG. 2 achieves a high speed, low torque drive ratio. It will be understood that any position of the selector lever 13 between those illustrated in FIGS. 1 and 2 will result in a corresponding intermediate position of the idler mechanism 9 to provide an intermediate drive ratio dependent upon the idler mechanism position.

Figure 3:
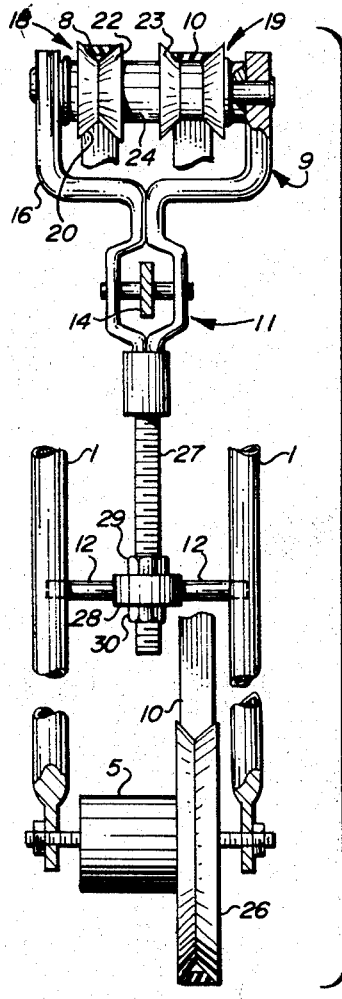
FIG. 3 is a partially cutaway fragmentary view showing the variable pitch idler mechanism in the lowest speed configuration.

Attention is now directed to FIG. 3 which illustrates the idler mechanism as viewed along the lines 3—3 of FIG. 1. As previously noted, the carriage 11 is pivotally fixed at the points 12 to the split portions of the frame 1 for fore and aft movement to positions dictated by the link 14 which is responsive to the position of the selector lever 13. The upper end of the carriage 11 is developed into a fork 16 to accommodate the idler mechanism 9. A shaft 17 extends across the fork 16 to provide support for pulley means 18 and 19 which receive, respectively, the belts 8 and 10. The outer halves 20 and 21, respectively, of the pulley means 18 and 19 are fixed in position by the outward pressure exerted by the belts 8 and 10 on the tapered surface thereof. However, the inner halves 22 and 23, respectively, of the pulley means 18 and 19, which are separated from one another by spacer means 24, are free to move laterally to the extreme positions shown in FIG. 3 and FIG. 4.

The inner halves 22 and 23 of the pulleys 18 and 19 and the spacer means 24 are integral such that the pulleys 18 and 19 will always rotate at the same angular velocity (assuming no belt slippage). However, it will be perceived that if the radial positions of the belts 8 and 10 in the respective pulleys 18 and 19 change, the overall ratio between the foot driven pulley 25 associated with the crank 6 and the pulley 26 associated with the coaster brake 5 will be altered.

Consider the low speed, high torque drive ratio illustrated in FIG. 3 which is set up by positioning the idler mechanism 9 forwardly as shown in FIG. 1. The tension of the belt 10 is increased by such forward movement since the pivot point 12 is forward from the axis of the coaster brake pulley 26. As a result, the belt 10 is pulled deeper into the pulley 19 which squeezes the integral unit comprising the inner pulley halves 22 and 23 and the spacer means 24 toward the outer half 20 of the pulley 18. Hence, the pulley 18 has developed a larger effective diameter while the pulley 19 has developed a smaller effective diameter. Either change would result in greater torque being transmitted between the foot operated crank 6 and the coaster brake 5. Since the pulleys 18 and 19 operate at the same angular velocity, and the diameter changes occur simultaneously, the effect is compounded to bring about a useful degree of ratio change with a compact configuration.

Figure 4:
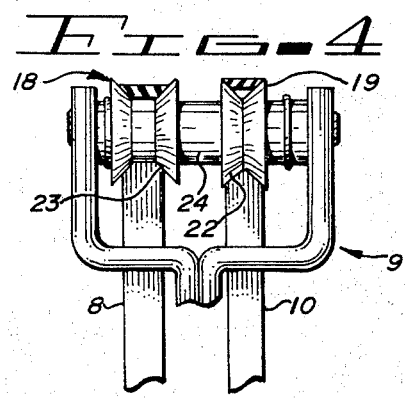
FIG. 4 illustrates a variable pitch idler mechanism in the highest speed position.

The high speed, low torque position of the mechanism is illustrated in FIGS. 2 and 4 in which it will be observed that the idler mechanism 9 has been shifted to its rearmost position which increases the tension on the belt 8 since the pivot point 12 is disposed rearwardly from the axis of rotation of the foot operated pulley 25. As a result, the unit comprising the pulley halves 23 and 22 and the spacer means 24 shift to the right to permit the belt 8 a deeper seat in the pulley 18 while simultaneously permitting the belt 10 to reassume a position in the pulley 19 radially outwardly from a previous position. The belt 8 is now driving a "smaller" pulley 18 which therefore has a higher angular velocity for a given angular velocity of the pulley 25. The pulley 19, operating at the same angular velocity as the pulley 18, is "larger" such that the ratio between the pulley 19 and the pulley 26 at the coaster brake has been altered toward the high speed, low torque side.

While only the two extreme positions have been illustrated, it will be immediately clear to those skilled in the art that intermediate positions of the ratio selector lever 13 will alter the fore and aft position of the idler mechanism 9 correspondingly to select any desired intermediate ratio, the friction brake means 15 functioning to hold the selected ratio and being adjusted to permit ready manual override at the operator's election.

Initial adjustment of the distance between the shaft 17 and the axis of rotation of the carriage 11 about the pivot means 12 is necessary to accommodate slightly different length belts which may be substituted for the belts 8 and 10 during normal maintenance. As shown in FIG. 3, one manner in which this function may be carried out is to extend the carriage 11 downwardly as a threaded rod portion 27 which extends through a pivoting block 28 disposed intermediate the pivot means 12 which extend into the frame sections 1. An upper nut 29 and a lower nut 30 may be adjusted in the obvious manner to raise or lower the carriage 11 and hence the idler mechanism 9 to achieve the desired relationship between the lengths and widths of the belts 8 and 10 and the fore and aft range of movement of the carriage 11.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. In a pedal operated vehicle, including a frame and a driven wheel hub, a variable ratio drive system comprising:
    a. a foot-operated crank, said crank including a first pulley supported on the vehicle for rotation about the axis of said pulley;
    b. a second pulley coupled to the driven wheel hub;
    c. a variable pitch idler mechanism, said idler mechanism including third and fourth pulleys, said third and fourth pulleys being disposed side-by-side on a common axis of rotation, said idler mechanism being disposed at a position vertically removed from a line extending through the axis of rotation said first and second pulleys;
    d. means pivotally mounting said idler mechanism for generally fore-and-aft arcuate movement;
    e. ratio selection means coupled to said idler mechanism for selectively positioning said idler mechanism within a fore-and-aft movement range;
    f. a first belt coupling said first pulley to said third pulley; and
    g. a second belt coupling said fourth pulley to said second pulley;

2. The variable ratio drive system of claim 1 in which said third and fourth pulleys are each inwardly tapered and split into inner and outer halves, said inner halves being fixed together for equal angular movement.

3. The variable ratio drive system of claim 2 in which said inner halves of said third and fourth pulleys have a range of movement along said common axis of rotation limited in each direction by said outer halves of said third and fourth pulleys.

4. The variable ratio drive system of claim 3 in which said ratio selection means includes a brake means for maintaining a selected position of said idler mechanism.

* * * * *